United States Patent [19]

Falke

[11] 3,998,571
[45] Dec. 21, 1976

[54] VALVE RETAINER

[75] Inventor: Jay F. Falke, Bristol, Tenn.

[73] Assignee: Sundstrand Corporation, Rockford, Ill.

[22] Filed: Apr. 14, 1975

[21] Appl. No.: 567,535

[52] U.S. Cl. .............................. 417/569; 137/512;
  137/512.3; 137/855
[51] Int. Cl.[2] .................. F16K 15/16; F04B 21/02;
  F04B 39/10
[58] Field of Search ............ 137/512, 512.1, 512.3,
  137/512.4, 525, 525.3, 454.2, 454.4, 454.6,
  516.11, 516.13, 516.15, 516.17, 516.19,
  516.21, 516.23, 512.15; 417/559, 560, 563,
  565, 567, 569

[56] References Cited
UNITED STATES PATENTS

| 870,659 | 11/1907 | Ackermann | 137/516.13 |
|---|---|---|---|
| 2,725,183 | 11/1955 | Hanson | 137/516 X |
| 2,848,157 | 9/1958 | Ayling | 137/516.11 X |
| 3,055,390 | 9/1962 | Scheldorf | 137/525 X |
| 3,112,064 | 11/1963 | Ayling | 137/516.11 X |
| 3,509,907 | 5/1970 | Gannaway | 137/512 |

*Primary Examiner*—William R. Cline
*Attorney, Agent, or Firm*—Wegner, Stellman, McCord, Wiles & Wood

[57] ABSTRACT

An economical valve assembly for mounting resilient metal leaf valves for the cylinder of a reciprocating compressor. A valve plate with suction and discharge ports has a discharge leaf or flapper valve with a mounting portion secured thereto by a pair of rivets which have elongated body portions that extend inwardly from the valve plate. The suction valve has a mounting portion with apertures through which the projecting portions of the discharge valve fasteners extend. The elongated portions of the fastener bodies are received in holes in the cylinder block, positioning the valve plate and valves on the block. Pressure on the discharge valve is established by the rivets while pressure on the suction valve is established by the valve plate mounting. Sufficient pressure to achieve a satisfactory seal is applied independently to the mounting portion of each of the leaf valves without causing distortion which might result in failure of the valve to seat properly.

9 Claims, 3 Drawing Figures

VALVE RETAINER

This invention is concerned with a flapper valve assembly particularly intended for a reciprocating piston compressor.

BACKGROUND OF THE INVENTION

Some reciprocating piston compressors, as for refrigeration systems, have suction and discharge valves which are resilient metal leaves or flappers that are edge mounted in cantilever fashion. Typically, a valve plate is secured to the compressor cylinder block and has suction and discharge ports for the cylinder. The suction valve is located on the underside of the valve plate, between the valve plate and the cylinder. The discharge valve is secured to the outer surface of the valve plate.

The pressure on the mounting portion of such resilient leaf valves is an important factor in the manufacture and operation of the compressor. The pressure must be sufficient to provide a reliable seal, but not so great that the thin metal of the leaf is distorted which would prevent it from seating against the flat surface of the valve plate. Prior constructions have either required several expensive parts to secure the valve to the plate and effect proper alignment of the plate with the cylinder block or have secured both of the valves to the plate with a single rivet. The first construction operates satisfactorily but is expensive both from the standpoint of parts and from manufacturing cost. The latter construction precludes independent selection of valve mounting pressures making it difficult to achieve a reliable seal with both valves.

One feature of the invention is the provision of a flapper valve assembly which includes an elongated fastener that extends through the mounting portion of the discharge leaf valve and the valve plate, securing the discharge leaf valve to the outer surface of the valve plate. The fastener has a portion projecting inwardly of the valve plate, through an aperture in the mounting portion of the suction leaf valve. The valve plate is secured to the body, as by a mounting bolt, with the mounting portion of the suction leaf valve held between the valve plate and the body. The parts are aligned by the elongated fastener and the mounting pressure may be independently selected.

Another feature is that the projecting portion of the elongated fastener extends into a hole on the body, adjacent the chamber, and thereby positions the valve plate and the suction valve with respect to the chamber. This facilitates the assembly of the parts in manufacture without barring additional elements which would add to the cost.

A further feature is that the fastener is a rivet having elongated body with an intermediate shoulder in engagement with the under surface of the valve plate and a head which secures the discharge leaf valve to the outer surface of the valve plate.

Further features and advantages of the invention will readily be apparent from the specification and from the drawings, in which.

Figure 2:
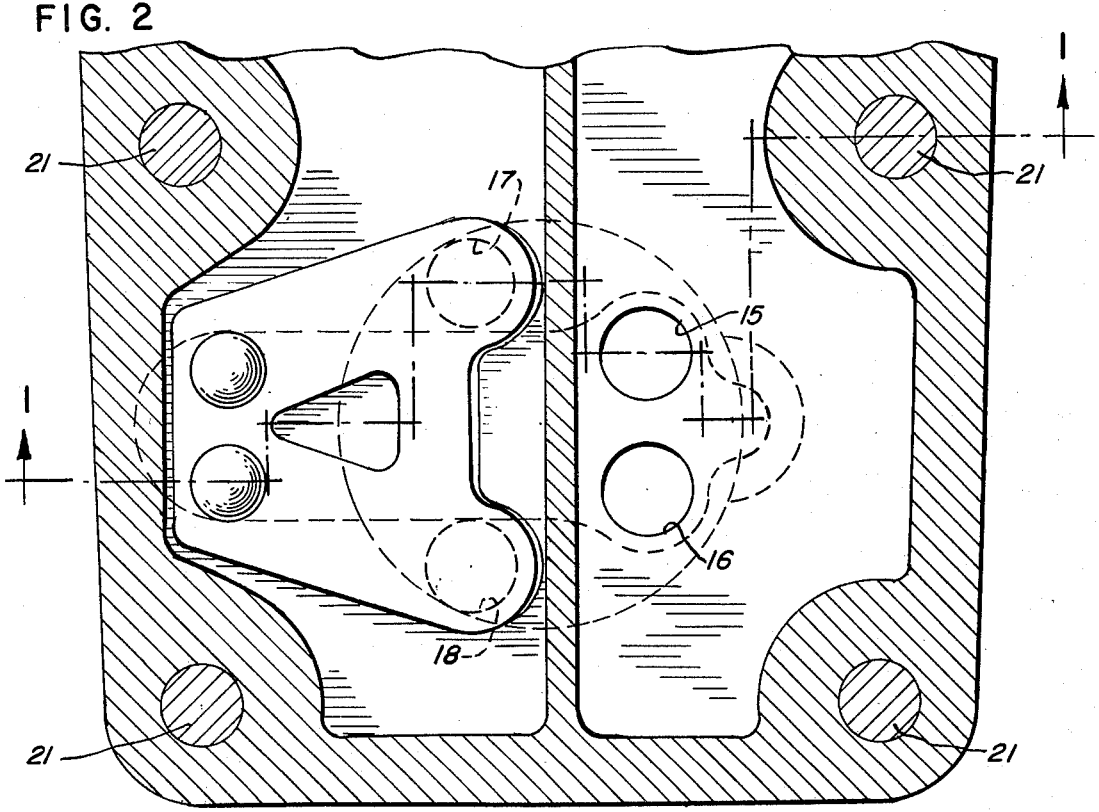
FIG. 2 is a transverse section taken generally along line 2—2 of FIG. 1.
Figure 1:
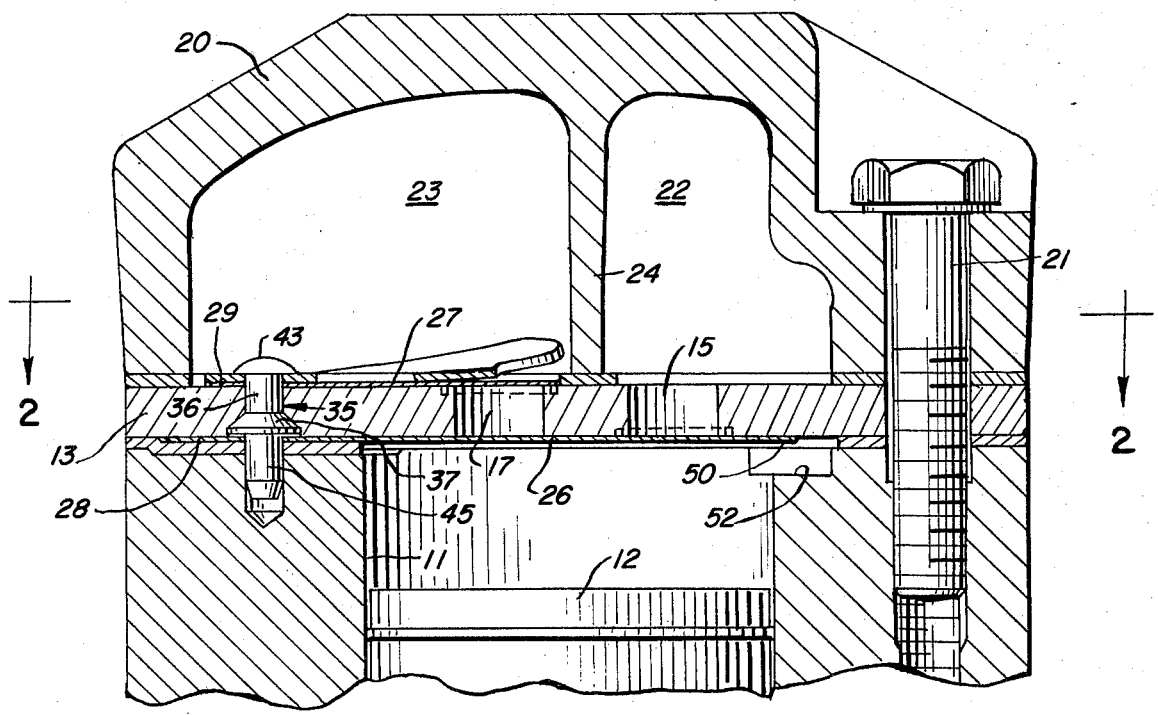
FIG. 1 is a fragmentary axial section through a cylinder and flapper valve assembly taken generally along the broken line 1—1 of FIG. 2.
Figure 3:
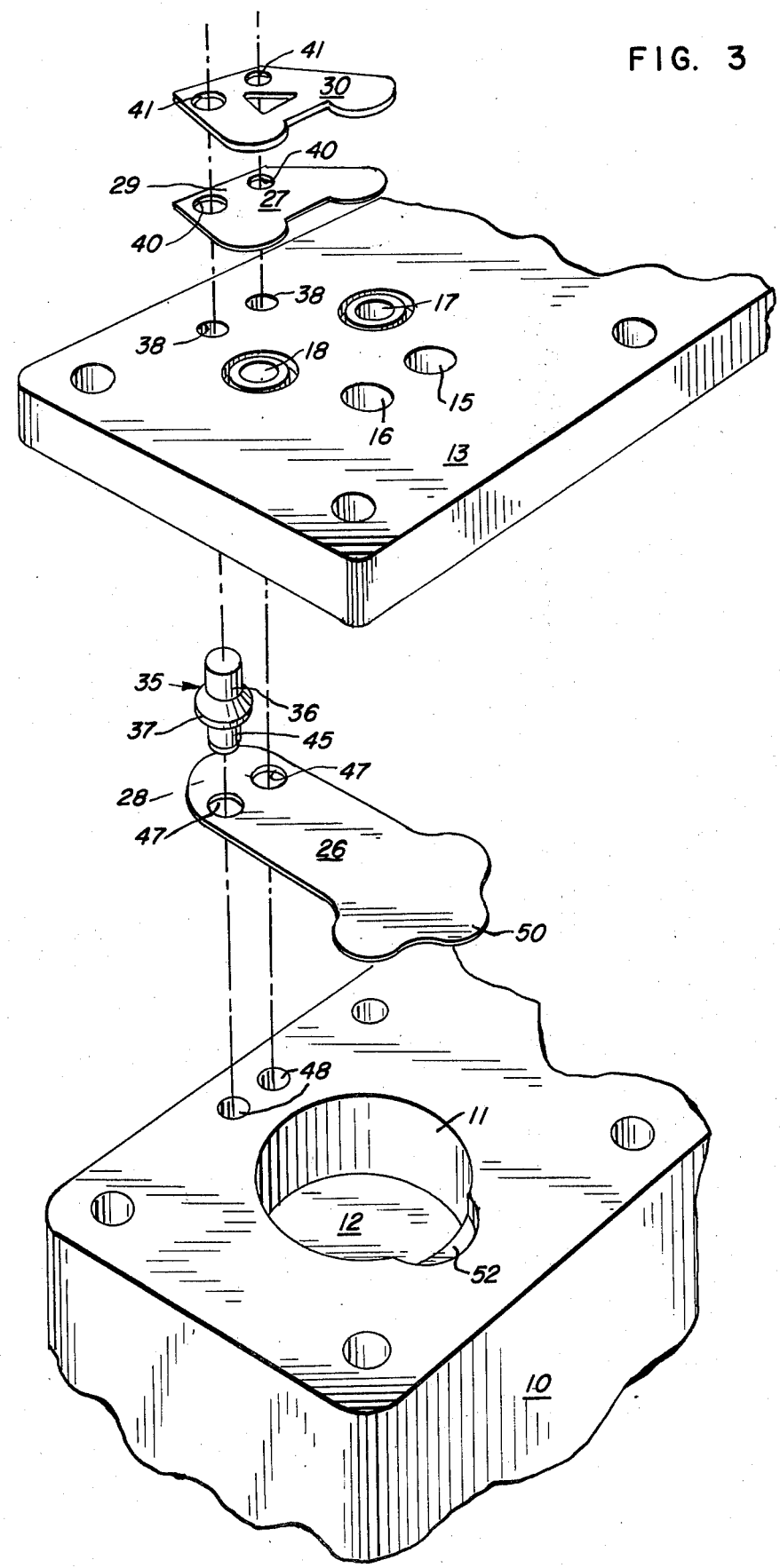
FIG. 3 is an exploded perspective with portions of the structure broken away and the gaskets not shown.

The flapper valve assembly is designed and particularly intended for the suction and discharge valves of a reciprocating piston compressor. The assembly could be used in other devices where cantilever mounted resilient metal leaf valves control the suction and discharge ports of a chamber subject to pressure variations.

Cylinder block 10 has therein a cylinder 11 in which piston 12 reciprocates. A valve plate 13 secured to the end of the piston block extends across the cylinder 11 and has therein a pair of suction ports 15, 16 and a pair of discharge ports 17, 18.

Cylinder head 20 is secured over valve plate 13 and the cylinder block 10 by head bolts 21. The cylinder head has a suction chamber 22 communicating with suction ports 15, 16 and a discharge chamber 23 communicating with discharge ports 17, 18. A wall 24 extending between the intake and discharge ports separates the two chambers. Suction and discharge valves 26, 27 are thin, flat resilient leaves or flappers which flex away from the valve plate when subjected to a pressure differential. Typically, they are of spring steel. Both have mounting portions at one end thereof and extend in cantilever fashion across the suction and discharge ports. Suction valve 26 underlies the valve plate 13 with its mounting portion 28 between the valve plate and the end surface of cylinder block 10. Discharge valve 27 overlies valve plate 13 with its mounting portion 29 generally aligned with the mounting portion 28 of the suction valve.

A valve lift retainer 30 overlies the discharge valve 27 limiting the upward flexure of the discharge valve. The discharge valve raises sufficiently to allow efficient escape of the compressed gas but does not move so far that it is overstressed.

The discharge valve 27 is secured to valve plate 13 by two rivets 35 each of which has an elongated body 36 with an intermediate shoulder 37. The mounting rivets 35 extend through mounting openings 38 in valve plate 13 with the shoulder 37 on the under surface of the plate. The mounting openings 38 have a tapered counterbore from the underside and the upper surface of shoulder 37 has a complementary taper to position the rivet in the desired location on the plate. The upper end of rivet body 36 extends through opening 40 in the mounting portion 29 of the discharge valve and through aligned opening 41 in the mounting portion of retainer 30. The upper end of the rivet body is formed over as indicated at 43 securing the discharge valve and retainer to the upper surface of the valve plate. Rivet body 36 has an end portion 45 which extends inwardly of valve plate 13 through positioning openings 47 in the mounting portion 28 of suction valve 26 and are received in holes 48 in cylinder block 10.

The extending portions 45 of the two rivets serve to align the suction valve 26 with the valve plate 13 and the valve plate and discharge valve 27 with cylinder 11. Special positioning pins commonly used to locate the valve plate on the cylinder block are unnecessary.

The pressure with which rivet head 43 is formed determines the mounting pressure on discharge valve 27. The pressure applied to the mounting portion 28 of suction valve 26 is established by head bolts 21. The pressure applied to the mounting portion of each valve is independently established so that the appropriate pressure can be applied to each to effect the necessary seal. Excessive pressure often causes distortion of the thin leaf valve allowing leakage and may be avoided since the pressures are independently established.

Suction valve 26 has an end portion 50 which extends into a recess in the cylinder wall diametrically opposite the valve mounting. The lower surface 52 of the recess is engaged by valve extension 50 limiting the movement of the suction valve.

A typical compressor has two or more pistons, each of which may use the flapper valve structure illustrated. The suction and discharge ports for the other cylinders also open into the suction and discharge chambers 22, 23.

I claim:

1. A flapper valve assembly for suction and discharge ports to a chamber, including:
   a body having a pressure chamber therein subject to alternate increase and reduction of pressure;
   a valve plate forming a wall of said chamber and having suction and discharge ports therethrough;
   a resilient metal leaf discharge valve overlying the discharge port and having a cantilever mounting portion;
   an elongated fastener extending through the mounting portion of the discharge leaf valve and the valve plate, securing the discharge leaf valve to the outer surface of the valve plate, said fastener having a portion projecting inwardly of the valve plate;
   a resilient metal leaf suction valve underlying said valve plate and having a cantilever mounting portion with an aperture therein through which said projecting fastener portion extends; and
   means locating said valve plate to said body, the mounting portion of the suction leaf valve being held between the valve plate and the body.

2. The flapper valve assembly of claim 1 in which the projecting portion of elongated fastener extends into a hole on said body, adjacent said chamber, positioning said valve plate and suction valve with respect to the chamber.

3. The flapper valve assembly of claim 1 in which said fastener is a rivet having an elongated body with an intermediate shoulder in engagement with the under surface of said valve plate and a head which secures the discharge leaf valve to the outer surface of the valve plate.

4. In a reciprocating piston compressor with a block having a cylinder therein, a piston reciprocable in the cylinder, a flapper valve assembly including:
   a valve plate overlying said cylinder and having suction and discharge ports therethrough communicating with said cylinder;
   a cylinder head overlying the valve plate with suction and discharge chambers therein, communicating with suction and discharge ports, respectively, and having a wall between the ports separating the chambers;
   a resilient metal leaf discharge valve overlying the discharge port and having a cantilever mounting portion at one edge thereof;
   an elongated fastener extending through the mounting portion of the discharge leaf valve and the valve plate, securing the discharge leaf valve to the outer surface of the valve plate, said fastener having a portion projecting inwardly of the valve plate;
   a resilient metal leaf suction valve underlying said valve plate and having a cantilever mounting portion with an aperture therein through which said projecting fastener portion extends; and
   means locating the valve plate to said cylinder block, the mounting portion of the suction leaf valve being held between the valve plate and the cylinder block.

5. The flapper valve assembly of claim 4 in which the projecting portion of the elongated fastener extends into a hole on said cylinder block, adjacent said cylinder, positioning the valve plate and suction valve with respect to the cylinder.

6. The flapper valve assembly of claim 4 in which said fastener is a rivet having an elongated body with an intermediate shoulder in engagement with the under surface of the valve plate and a head which secures the discharge valve leaf to the outer surface of the valve plate.

7. The flapper valve assembly of claim 6 in which said rivet establishes the pressure on the mounting portion of the discharge leaf valve and in which head bolts secure the cylinder head and the valve plate to the cylinder block, said head bolts establishing the pressure on the mounting portion of the suction leaf valve, independent of the rivet pressure on the mounting portion of the discharge leaf valve.

8. The flapper valve assembly of claim 4 in which the projecting portion of the elongated fastener extends into a hole on said cylinder block, adjacent said cylinder, positioning the valve plate and suction valve with respect to the cylinder and said fastener is a rivet having an elongated body with an intermediate shoulder in engagement with the under surface of the valve plate and a head which secures the discharge valve leaf to the outer surface of the valve plate.

9. The flapper valve assembly of claim 8 having two rivets securing the discharge mounting portion of the discharge leaf valve to the valve plate.

* * * * *